（12）United States Patent
Dooley et al.

(10) Patent No.: US 7,603,543 B2
(45) Date of Patent: Oct. 13, 2009

(54) METHOD, APPARATUS AND PROGRAM PRODUCT FOR ENHANCING PERFORMANCE OF AN IN-ORDER PROCESSOR WITH LONG STALLS

(75) Inventors: Miles Robert Dooley, Austin, TX (US); Scott Bruce Frommer, Cold Spring, NY (US); Hung Qui Le, Austin, TX (US); Sheldon B. Levenstein, Austin, TX (US); Anthony Saporito, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/055,862

(22) Filed: Feb. 11, 2005

(65) Prior Publication Data

US 2006/0184772 A1  Aug. 17, 2006

(51) Int. Cl.
*G06F 9/30* (2006.01)
(52) U.S. Cl. .................... 712/229; 712/220
(58) Field of Classification Search ............ 712/220, 712/229
See application file for complete search history.

(56) References Cited

U.S. PATENT DOCUMENTS

| 5,870,602 | A |   | 2/1999 | Miller et al. |   |
|---|---|---|---|---|---|
| 5,958,041 | A | * | 9/1999 | Petolino et al. | 712/214 |
| 5,987,594 | A | * | 11/1999 | Panwar et al. | 712/216 |
| 6,088,788 | A |   | 7/2000 | Borkenhagen et al. |   |
| 6,754,808 | B1 | * | 6/2004 | Roth et al. | 712/218 |
| 7,203,799 | B1 |   | 4/2007 | Ball |   |
| 2006/0179264 | A1 |   | 8/2006 | Hinojosa et al. |   |

OTHER PUBLICATIONS

James Dundas and Trevor Mudge, "Improving data cache performance by pre-executing instructions under a cache miss," International Conference on Supercomputing, Proceedings of the 11th international conference on Supercomputing, pp. 68-75, Year of Publication: 1997.*
Tullsen et al., Simultaneous Multithreading: Maximizing On-Chip Parallelism, ISCA '95, 1995.*
Llena, Enric Morancho—Address Prediction and Recovery Mechanisms, May 2002, pp. 149-178 specifically.*

* cited by examiner

*Primary Examiner*—Eddie P Chan
*Assistant Examiner*—Keith Vicary
(74) *Attorney, Agent, or Firm*—Yee & Associates, P.C.; Diana R. Gerhardt

(57) ABSTRACT

A method, system, and computer program product for enhancing performance of an in-order microprocessor with long stalls. In particular, the mechanism of the present invention provides a data structure for storing data within the processor. The mechanism of the present invention comprises a data structure including information used by the processor. The data structure includes a group of bits to keep track of which instructions preceded a rejected instruction and therefore will be allowed to complete and which instructions follow the rejected instruction. The group of bits comprises a bit indicating whether a reject was a fast or slow reject; and a bit for each cycle that represents a state of an instruction passing through a pipeline. The processor speculatively continues to execute a set bit's corresponding instruction during stalled periods in order to generate addresses that will be needed when the stall period ends and normal dispatch resumes.

3 Claims, 3 Drawing Sheets

METHOD, APPARATUS AND PROGRAM PRODUCT FOR ENHANCING PERFORMANCE OF AN IN-ORDER PROCESSOR WITH LONG STALLS

BACKGROUND OF THE INVENTION

1. Technical Field

The present invention relates generally to an improved data processing system and, in particular, to a method, apparatus, and computer program product for optimizing performance in a data processing system. Still more particularly, the present invention provides a method, apparatus and computer program product for enhancing performance of an in-order microprocessor with long stalls.

2. Description of Related Art

A microprocessor is a silicon chip that contains a central processing unit (CPU) which controls all the other parts of a digital device. Designs vary widely but, in general, the CPU consists of the control unit, the arithmetic and logic unit (ALU) and memory (registers, cache, RAM and ROM) as well as various temporary buffers and other logic. The control unit fetches instructions from memory and decodes them to produce signals which control the other part of the computer. This may cause the control unit to transfer data between memory and ALU or to activate peripherals to perform input or output. A parallel computer has several CPUs which may share other resources such as memory and peripherals. In addition to bandwidth (the number of bits processed in a single instruction) and clock speed (how many instructions per second the microprocessor can execute, microprocessors are classified as being either RISC (reduced instruction set computer) or CISC (complex instruction set computer).

A technique used in advanced microprocessors where the microprocessor begins executing a second instruction before the first has been completed is called pipelining. That is, several instructions are in the pipeline simultaneously, each at a different processing stage. The pipeline is divided into segments and each segment can execute the segment's operation concurrently with the other segments. When a segment completes an operation, the segment passes the result to the next segment in the pipeline and fetches the next operation from the preceding segment. The final results of each instruction emerge at the end of the pipeline in rapid succession. This arrangement allows all the segments to work in parallel thus giving greater throughput than if each input had to pass through the whole pipeline before the next input could enter. The costs are greater latency and complexity due to the need to synchronize the segments in some way so that different inputs do not interfere. The pipeline only works at full efficiency if the pipeline can be filled and emptied at the same rate that the pipeline can process.

In a pipelined in-order processor with long latencies, cache misses and translation misses create long stalls which can hinder performance significantly. Out-of-order machines reduce the penalty incurred when an instruction is unable to execute by allowing other, subsequent instructions to execute independently. The drawback of an out-of-order machine is the tremendous complexity required to find independent instructions and resolve dependency hazards. As processor speed increases, supporting such complexity becomes impractical. The use of touch instructions can reduce the likelihood of a cache miss because touch instructions allow a program to request a cache block fetch before the instruction is actually needed by the program. But touch instructions require foreknowledge at compile time and occupy instruction slots that could otherwise hold other instructions. Prefetch mechanisms can also reduce cache misses by anticipating which instructions are likely to be executed in the future, but are inexact.

Therefore, it would be advantageous to have an improved method, apparatus, and computer program product for reducing time lost to stalls. It would further be advantageous to have a mechanism for enhancing Load/Store performance of an in-order processor that has long stalls.

SUMMARY OF THE INVENTION

The present invention provides a method, apparatus, and computer program product for enhancing performance of an in-order microprocessor with long stalls. In particular, the mechanism of the present invention provides a data structure for storing data within the processor. The mechanism of the present invention comprises a data structure including information used by the processor. The data structure includes a group of bits to keep track of which instructions preceded a rejected instruction and therefore will be allowed to complete and which instructions follow the rejected instruction. The group of bits comprises a bit indicating whether a reject was a fast or slow reject and a bit for each cycle that represents a state of an instruction passing through a pipeline. The processor speculatively continues to execute a set bit's corresponding instruction during stalled periods in order to generate addresses that will be needed when the stall period ends and normal dispatch resumes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
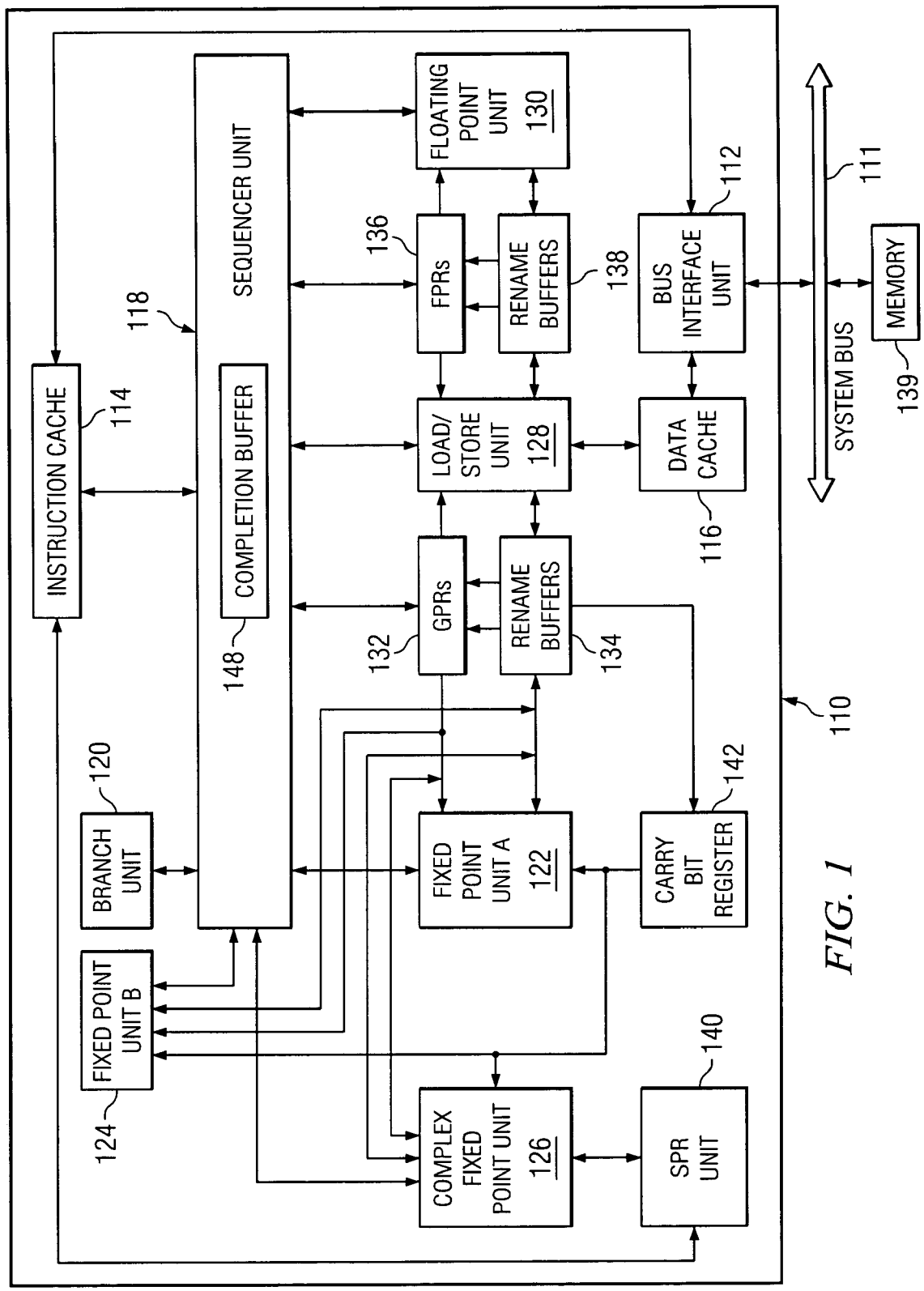
FIG. 1 is a block diagram of a processor system for processing information according to the preferred embodiment.

FIG. 1 is a block diagram of a processor 100 system for processing information according to the preferred embodiment. Referring to FIG. 1, an exemplary block diagram of a dual threaded processor design showing functional units and registers in accordance with a preferred embodiment of the present invention is shown. The processor is generally designated by reference number 100. Processor 100 comprises a single integrated circuit superscalar microprocessor with dual-thread SMT. Accordingly, as discussed further herein below, processor includes various units, registers, buffers, memories, and other sections, all of which are formed by integrated circuitry. Also, in a preferred embodiment of the present invention, processor 100 operates according to reduced instruction set computer ("RISC") techniques.

As shown in FIG. 1, Instruction Fetch Unit 103 (IFU) is connected to Instruction Cache 101. Instruction Cache 101 holds instructions for multiple programs (threads) to be executed. Instruction Cache 101 also has an interface to Level 2 Cache/Memory 120. IFU 103 requests instructions from Instruction Cache 101 according to an instruction address, and passes instructions to Instruction Decode Unit 104. In a preferred embodiment of the present invention, IFU 103 can request multiple instructions from Instruction Cache 101 for up to two threads at the same time. Instruction Decode Unit 104 decodes multiple instructions for up to two threads at the same time and passes decoded instructions to Instruction Dispatch Unit 105 (IDU). IDU 105 selectively groups decoded instructions from Instruction Decode Unit 104 for each thread, and outputs a group of instructions for each thread to execution circuitry 106, 107a, 107b, 108a, 108b, 109a, and 109b of the processor.

In a preferred embodiment of the present invention, the execution circuitry of the processor may include, Branch Unit 106, Fixed-Point Execution Units 108a (FXUA) and 108b (FXUB), Load/Store Units 107a (LSUA) and 107b (LSUB), and Floating-Point Execution Units 109a (FPUA) and 109b (FPUB). Execution units 106, 107a, 107b, 108a, 108b, 109a, and 109b are fully shared across both threads. The processor includes multiple register sets 110a, 110b, 111a, 111b, 112a, 112b, and 112c separately for each of the two threads, namely General Purpose Registers 110a and 110b (GPR), Floating-Point Registers 111a and 111b (FPR), and Special Purpose Registers 112a and 112b (SPR). The processor additionally includes a set of SPRs 112c which is shared across both threads. Simplified internal bus structure 117 is shown to depict connections between execution units 106, 107a, 107b, 108a, 108b, 109a, and 109b and register sets 110a, 110b, 111a, 111b, 112a, 112b, and 112c.

FPUA 109a and FPUB 109b input their register source operand information from and output their destination register operand data to FPRs 111a and 111b according to which thread each executing instruction belongs to. FXUA 108a, FXUB 108b, LSUA 107a, and LSUB 107b input their register source operand information from and output their destination register operand data to GPRs 110a and 110b according to which thread each executing instruction belongs to. A subset of instructions executed by FXUA 108a, FXUB 108b, and Branch Unit 106 use SPRs 112a, 112b and 112c as source and destination operand registers. LSUA 107a and LSUB 107b input their storage operands from and output their storage operands to Data Cache 102 which stores operand data for multiple programs (threads). Data Cache 102 also has an interface to Level 2 Cache/Memory 120.

In response to the instructions input from Instruction Cache 101 and decoded by Instruction Decode Unit 104, IDU 105 selectively dispatches the instructions to execution units 106, 107a, 107b, 108a, 108b, 109a, and 109b. Execution units 106, 107a, 107b, 108a, 108b, 109a, and 109b execute one or more instructions of a particular class of instructions. For example, FXUA 108a and FXUB 108b execute fixed-point mathematical operations on register source operands, such as addition, subtraction, ANDing, ORing and XORing. FPUA 109a and FPUB 109b execute floating-point mathematical operations on register source operands, such as floating-point multiplication and division. LSUA 107a and LSUB 107b execute load and store instructions which move operand data between Data Cache 102 and registers 110a, 110b, 111a, and 111b. Branch Unit 106 executes branch instructions which conditionally alter the flow of execution through a program by modifying the instruction address used by IFU 103 to request instructions from Instruction Cache 101.

IDU 105 groups together decoded instructions to be executed at the same time, depending on the mix of decoded instructions and available execution units 106, 107a, 107b, 108a, 108b, 109a, and 109b to perform the required operation for each instruction. For example, because there are only two Load/Store Units 107a and 107b, a maximum of two Load/Store type instructions may be grouped together. In a preferred embodiment of the present invention, up to seven instructions may be grouped together (two Fixed-Point arithmetic, two Load/Store, two Floating-Point arithmetic, and one Branch), and up to five instructions may belong to the same thread. IDU 105 includes in the group as many instructions as possible from the higher priority thread, up to five, before including instructions from the lower priority thread. Values in Special Purpose Registers 112a and 112b indicate thread priority 118 to IDU 105.

Instruction Completion Unit 116 monitors internal bus structure 117 to determine when instructions executing in execution units 106, 107a, 107b, 108a, 108b, 109a, and 109b are finished writing their operand results. Instructions executed by Branch Unit 106, FXUA 108a, FXUB 108b, LSUA 107a, and LSUB 107b require the same number of cycles to execute, while instructions executed by FPUA 109a and FPUB 109b require a variable, and a larger number of cycles to execute. Therefore, instructions which are grouped together and start executing at the same time do not necessarily finish executing at the same time. When all the instructions grouped together within a thread are finished writing their operand results, the group is said to be "completed".

Instruction Completion Unit 116 monitors for the completion of instruction, and sends control information 119 to IDU 105 to identify that more groups of instructions can be dispatched to execution units 106, 107a, 107b, 108a, 108b, 109a, and 109b. IDU 105 sends control information 125 to IFU 103 and Instruction Decode Unit 104 to indicate that it is ready to receive more decoded instructions.

Processor 100 preferably also includes error detection circuitry (not shown on FIG. 1) throughout all functional units, and Recovery Unit 115 which contains a backup copy of registers 110a, 110b, 111a, 111b, 112a, 112b, and 112c for both threads. Results written to register sets 110a, 110b, 111a, 111b, 112a, 112b, and 112c are also written to queue structures 113a, 113b, 114a, and 114b over internal bus structure 117. Register results from Branch Unit 106, FXUA 108a, FXUB 108b, LSUA 107a, and LSUB 107b are held in Write Queue 113a and 113b according to which thread the associated instruction belongs to. Write Queue 113a and 113b for each thread is a simple First-In-First-Out (FIFO) queue structure. Because instructions executed by FPUA 109a and FPUB 109b require a variable, and a larger number of cycles to execute, these results are written to FPR Reorder Buffer 114a and 114b according to which thread the associated instruction belongs to. FPR Reorder Buffer 114a and 114b arranges for each thread the results from FPUA 109a and FPUB 109b in the sequence which the associated instructions occurred in the program originally supplied by Instruction Cache 101.

The register results are held in Write Queue 113a and 113b and FPR Reorder Buffer 114a and 114b for each thread until Completion Unit 116 indicates (via control 119) that all instructions in the group have completed for each thread. If no errors are reported by the error detection circuitry (not shown in FIG. 1), the results are drained from queue structures 113a, 113b, 114a, and 114b into the backup copy of the associated registers in Recovery Unit 115. In the event of an error, Recovery Unit 115 discards the contents of Write Queue 113a and 113b and FPR Reorder Buffer 114a and 114b for each thread, and restores the backup copy of register sets 110a, 110b, 111a, 111b, 112a, 112b, and 112c using internal bus structure 117. Processing may then be resumed from the known error-free instruction boundary.

Some of SPRs 112a, 112b, and 112c hold information used to control the operation of the various functional units. This is represented, simplified, in FIG. 1 by connection 118. SPRs 112a and 112b have separate copies for each thread, while 112c is shared across all threads. Not limited to these examples, SPRs 112a, 112b, and 112c may include instruction addresses, thread priority control, condition code, save/restore addresses, machine state, et cetera.

A lookahead mode processor offers a solution to the performance problem from long stalls due to cache misses and translation misses. Load/Store performance in an in-order machine can be improved by speculatively continuing to execute instructions in a "lookahead mode" during stalled periods in order to generate addresses that will be needed in the L1 cache and translation mechanism. This assures that needed data is available when the stall period ends and normal dispatch resumes, avoiding additional stalls. Lookahead mode functions somewhat like a very exact prefetch mechanism which allows the Load/Store unit to make use of processor cycles that would otherwise go unused.

Because lookahead instructions are speculative and must not complete, it is important for multiple execution units to precisely synchronize their translations into and out of lookahead mode. Failure to be in lock step at any point can result in a thread hang. Furthermore, because there may be different reasons for entering lookahead mode, with different criteria for exiting, information about the type of lookahead mode must be maintained and synchronized. The Sequencer must also be able to recover from false start transitions.

Precisely synchronized lookahead mode across multiple execution units requires a sophisticated lookahead mode sequencer which tracks the state of instructions in various stages as they move through the pipeline.

There are many different reasons for an in-order machine to switch into lookahead mode. Two broad categories are "fast rejects," where an instruction can not be executed immediately, typically due to a momentary resource conflict, and "slow rejects," where an instruction cannot be executed until some external event occurs. Cache and translation misses are examples of slow rejects.

Fast rejects can be redispatched as soon as possible. Since multiple execution units may be involved, latency can be quite long, and significant overhead is involved, there may still be several cycles of delay before the rejected instruction can be redispatched. During this time, subsequent instructions may continue in lookahead mode.

Slow rejects must wait for notification that the external event has occurred before restarting normal dispatch. After this notification, or "restart" signal, there may still be an additional several cycles delay before the rejected instruction can be redispatched. To reduce this additional delay, an earlier "restart-coming" signal is sent in anticipation of a likely restart. This is possible because although it is not known whether the external event will actually occur, it is known that if the external event is going to occur soon, the external event's occurrence will either be near a particular point in time at the soonest, or else not for a very long time afterward.

Thus, the restart-coming signal is used to speculatively initiate the redispatch starting from the rejected instruction, but these speculatively initiated instructions must be discarded if the awaited event did not occur. In this case the machine must return to lookahead mode.

Because the two types of rejects require different behaviors, two types of lookahead modes are needed. Because exiting lookahead mode may be speculative, the microprocessor needs to remember which type of lookahead mode the microprocessor had been in so as to return to the correct type of lookahead mode.

Figure 2:
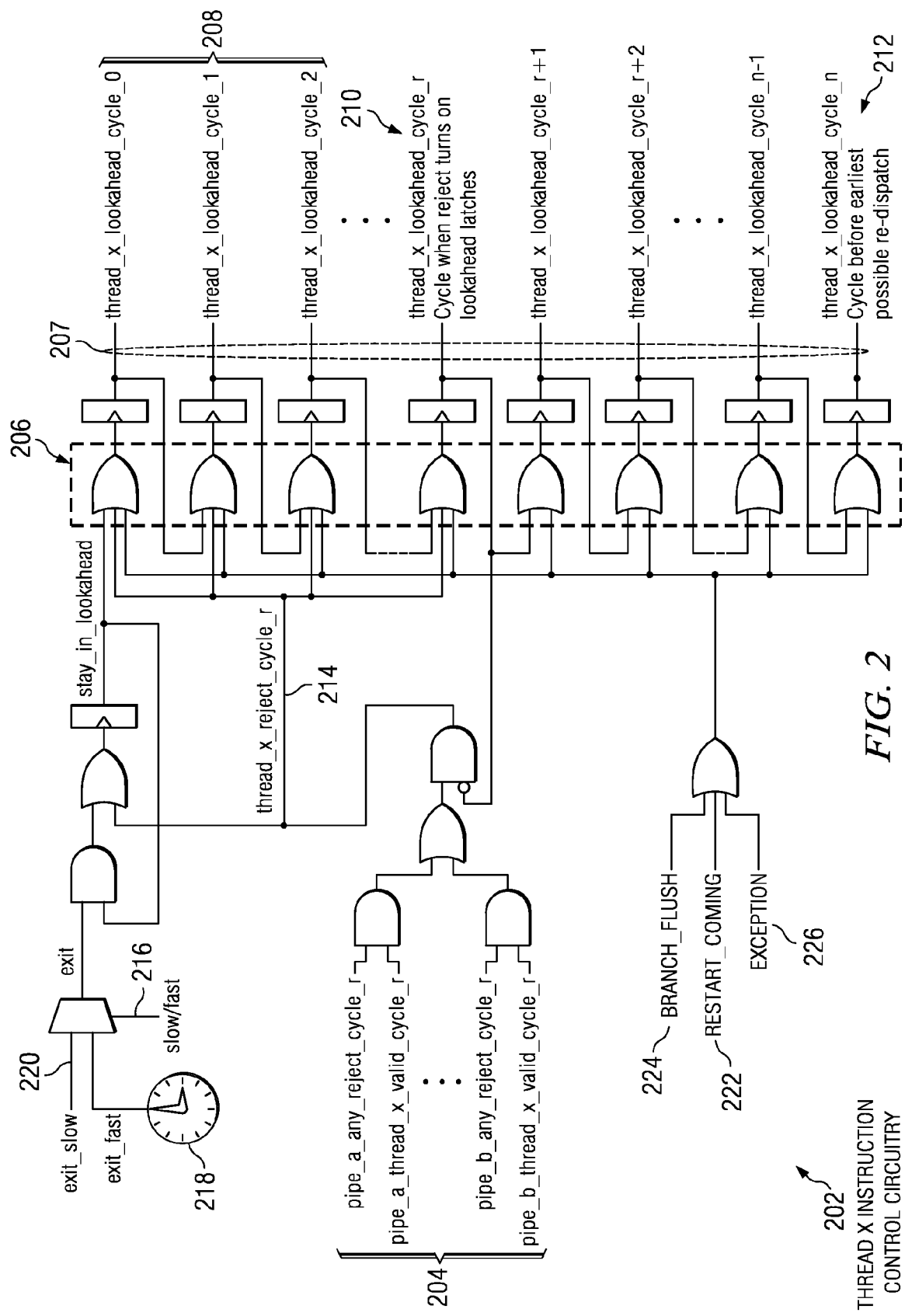
FIG. 2 is a diagram of specified bits for thread "x" in a pipelined processor in accordance with a preferred embodiment of the present invention.

FIG. 2 shows specified bits in a pipelined processor. Because a pipelined processor typically has several instructions "in flight" at any given moment, each at a different stage of the pipeline, and events occur at several different stages of the pipeline which might cause an instruction, such as instruction processed by circuitry 202, to be rejected by circuitry 204, several bits of state (lookahead bits 207 provided by block 206, hereinafter referred to as "lookahead bits") must be maintained to keep track of which instructions associated with a given cycle such as those indicated below 210 (i.e. instructions associated with cycle r+1, cycle r+2, . . . , cycle n−1, cycle n) preceded the rejected instruction and therefore will be allowed to complete, and which instructions associated with a given cycle such as is indicated at 208 follow the rejected instruction and thus must be considered to be in lookahead mode. Nth bit 212 of lookahead bits 207 represents the state of instruction processed by circuitry 202 which has progressed n cycles through the unit.

In the preferred embodiment, a bit storing a '1' indicates that an instruction which has progressed through the pipeline to that cycle represented by that particular bit is in lookahead mode. A '0' stored in that bit indicates that that instruction is not in lookahead mode, the instruction is in normal mode, and will likely complete.

In a superscalar machine with multiple identical pipelines, further complexity is required to determine which instructions in the same pipeline stage as rejected instruction processed by circuitry 202 are in lookahead mode and which will complete normally. In a multi-threaded machine, separate copies of the lookahead state must be maintained for each thread.

There is a stage in the pipeline in which an instruction processed by circuitry 202 may be rejected. In the preferred implementation, that stage is named "A3." Instruction processed by circuitry 202 which rejects by circuitry 204 because of a conflict at some earlier stage is not considered to have rejected until the instruction reaches A3 stage. This allows arbitration between multiple fast and slow rejects of different priorities. One bit in lookahead bits 207 is maintained per thread for each cycle that an instruction is passing through the Load/Store pipeline. When the rejected instruction is in A3 stage as indicated at 214, certain lookahead bits provided by block 207 for that instruction's thread are set. Lookahead type bit 216 for that thread is assigned a value indicating whether the reject was a fast or slow reject.

If reject 204 is a fast reject, the cycle of the earliest dispatch is known. If rejected instruction 202 is not redispatched in that earliest cycle, then no instruction from that thread is dispatched in that cycle. Simple counter 218 is started at reject time and counts down to that cycle.

Figure 3:
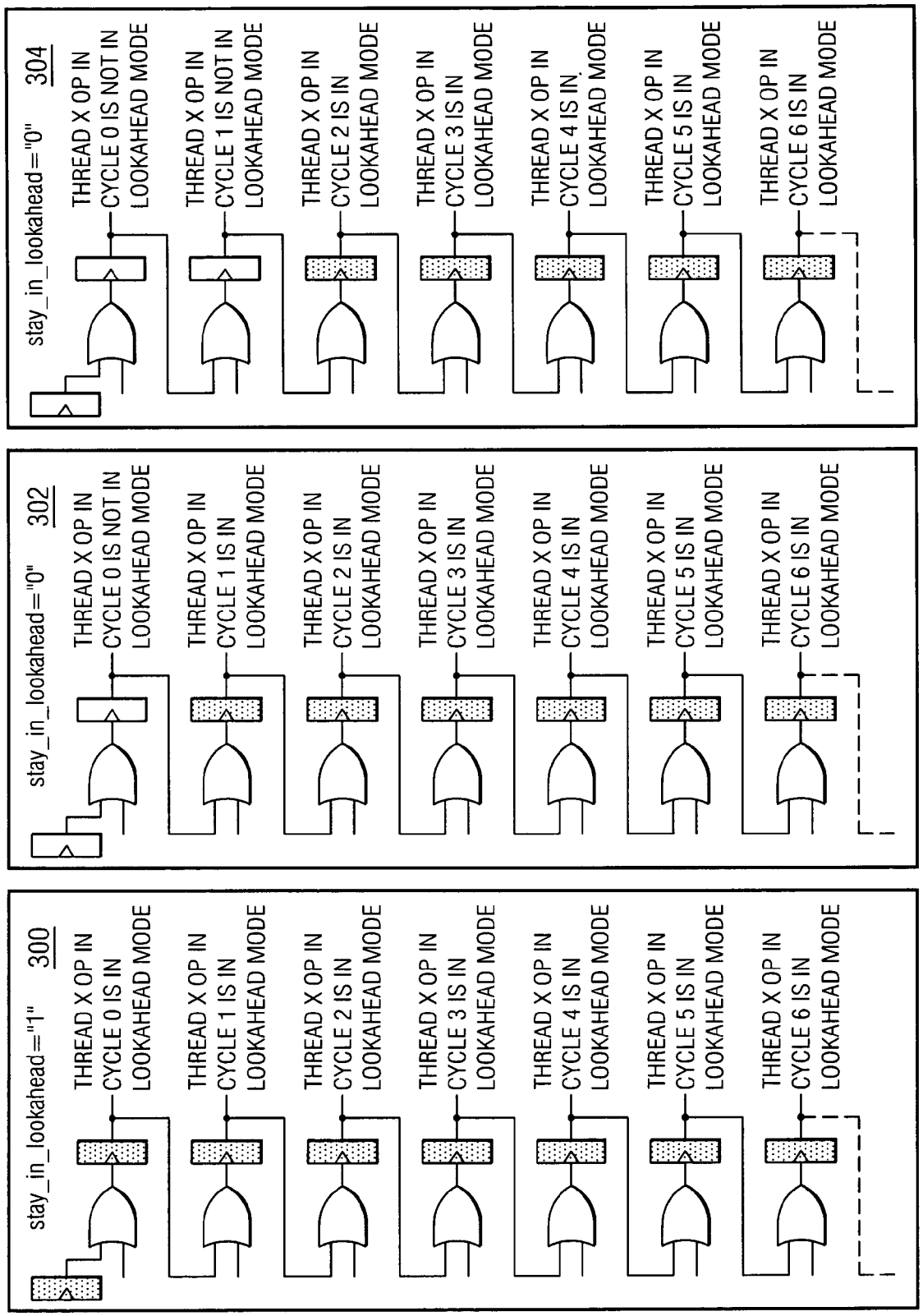
FIG. 3 is a diagram of lookahead bits in various stages of trickling out in accordance with a preferred embodiment of the present invention.

FIG. 3 shows that when that cycle arrives, lookahead bits 300 trickle out one at a time, so that in first cycle 302 of normal dispatch the first bit is reset, in second cycle 304 the first two bits are reset, and so on.

In the event of a slow reject, lookahead bits 207 are set, as with the fast reject. But because lookahead type bit 216 for that thread is set to indicate slow lookahead mode, the bits do not automatically trickle after a predetermined interval. They do not begin to trickle out until notified that external event 220 has taken place.

Because restart-coming signal 222 is inexact, instruction processed by circuitry 202, which in this described scenario is a slow-rejected instruction, might be redispatched by the Instruction Dispatch unit in anticipation that external event 220 will have happened just in time for instruction processed by circuitry 202 to execute, when in fact external event 220 has not happened and will not happen for a long time. In this case, the machine must return to slow lookahead mode.

In the preferred embodiment, restart-coming signal 222 is used to set lookahead type bit 216 to indicate slow type and force all of lookahead bits 207 on, in case a false restart has caused these bits to begin turning off. A subsequent restart due to external event 220 starts the trickling out process similar to that described for the fast reject. As long as external event 220 has not yet occurred, another restart-coming signal 222 may be sent periodically, which switches on all of lookahead bits 207 in case any have been turned off by a false restart. Switching on all of lookahead bits 207 returns the microprocessor to the lookahead state that the microprocessor would have been in had the false restart-coming and restart never been sent. This process may be duplicated elsewhere to assure synchronization between Load/Store, Instruction Dispatch, and Fixed Point units.

Beyond fast and slow rejects, there may be other conditions which initiate lookahead mode. These may require other rules for entering and exiting lookahead mode. Branch flushes 224, system calls, and exceptions 226 are examples. In the preferred embodiment, branch flushes 224 are detected indirectly. The Sequencer monitors whether the Fixed Point unit has blocked write back on a particular instruction, such as instruction processed by circuitry 202. A determination is then made as to whether this write back block was caused by one of the fast or slow rejects or locally generated exception 226. If writeback was blocked, and a fast or slow reject or locally generated exception 226 was not the cause, then the cause is assumed to be branch flush 224, or something that resembles branch flush 224, such as a system call. In the event of branch flush 224, the next instruction to be dispatched is in normal mode, but all those already in flight are considered to be in lookahead mode. All of lookahead bits 207 are set, but no countdown counter is used, for the bits immediately begin to trickle out. In the preferred embodiment, locally generated exception 226 sets lookahead bits 207 and allows them to immediately trickle out exactly as branch flush 224 does. Locally generated exceptions 226 differ from branch flush 224 in that they are detected directly, and detected exception conditions must go through arbitration by priority and position in the instruction sequence just as fast and slow rejects do.

When any bit is in lookahead mode, the processor speculatively continues to execute the bit's corresponding instruction during stalled periods in order to generate addresses of data that will be needed in the L1 cache and whose translations will be needed in the translation mechanism. This assures that needed data is available when the stall period ends and normal dispatch resumes, avoiding additional stalls. Lookahead mode allows the Load/Store unit to make use of processor cycles that would otherwise go unused. But because a lookahead instruction is speculative, the instruction must not complete until the corresponding lookahead bit is reset.

When a Load/Store instruction is in lookahead mode and the address it would generate is dependant on the results of an earlier instruction which itself was in lookahead mode, the address generated may not be correct. In this case, if data at the address is not already in the cache, it will not be fetched into the cache.

The present invention offers a solution to the performance problem from long stalls due to cache misses and translation misses. Load/Store performance in an in-order machine can be improved by speculatively continuing to execute instructions in a "lookahead mode" during stalled periods in order to generate addresses that will be needed in the L1 cache and translation mechanism. This assures that needed data is available when the stall period ends and normal dispatch resumes, avoiding additional stalls.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for storing data within a processor, the method comprising:
    tracking which instructions in a pipeline are ahead of a rejected instruction in the pipeline and therefore will be allowed to complete and which instructions in the pipeline follow in time the rejected instruction;
    indicating whether the rejected instruction was a fast or slow reject; and
    representing, for each individual cycle of an instruction currently passing through the pipeline, a lookahead state of the instruction as it passes through each stage of the pipeline; wherein the processor speculatively continues executing an instruction in a lookahead state during stalled periods, with the instruction that continues to execute during stalled periods being a lookahead instruction in that it does not fully execute to completion during the stalled periods, in order to generate addresses that will be needed when a stall period ends and normal dispatch resumes, wherein if the reject is a fast reject, calculating a dispatch cycle of the rejected instruction, starting a counter to count down to the dispatch cycle of the rejected instruction, executing instructions in the pipeline while the counter is counting down to the dispatch cycle of the rejected instruction, and after the counter has counted down to the dispatch cycle of the rejected instruction, resetting a lookahead state of a different given instruction in the pipeline for each one of a plurality of successive cycles to permit each one of a plurality of given instructions to complete.

2. A data processing system for storing data, the system comprising:
    hardware tracking means for tracking which instructions in a pipeline of a pipelined processor are ahead of a rejected instruction in the pipeline and therefore will be allowed to complete and which instructions follow the rejected instruction;

indicating means for indicating whether a reject was a fast or slow reject; and representing means for representing, for each individual cycle of an instruction currently passing through the pipeline, a state of the instruction as it passes through each stage of the pipeline; wherein the processor speculatively continues executing an instruction in a lookahead state during stalled periods in order to generate addresses that will be needed when a stall period ends and normal dispatch resumes, calculating means for calculating a dispatch cycle of the rejected instruction if the reject is a fast reject, starting means for starting a counter to count down to the dispatch cycle of the rejected instruction if the reject is a fast reject, execute means for executing instructions in the pipeline while the counter is counting down to the dispatch cycle of the rejected instruction if the reject is a fast reject, and resetting means for resetting, after the counter has counted down to the dispatch cycle of the rejected instruction, a lookahead state of a different given instruction in the pipeline for each one of a plurality of successive cycles to permit each one of a plurality of given instructions to complete if the reject is a fast reject.

3. A computer program product tangibly encoded in a computer readable recordable-type media for use in a data processing system for storing data, the computer program product comprising:

first instructions for tracking which instructions in a pipeline are ahead of a rejected instruction in the pipeline and therefore will be allowed to complete and which instructions follow the rejected instruction;

second instructions for indicating whether a reject was a fast or slow reject; and third instructions for representing, for each individual cycle of an instruction passing through a pipeline, a state of the instruction as it passes through each stage of the pipeline; wherein the processor speculatively continues executing an instruction in a lookahead state during stalled periods in order to generate addresses that will be needed when a stall period ends and normal dispatch resumes, wherein if the reject is a fast reject, fourth instructions for calculating a dispatch cycle of the rejected instruction, fifth instructions for starting a counter to count down to the dispatch cycle of the rejected instruction, sixth instructions for executing instructions in the pipeline while the counter is counting down to the dispatch cycle of the rejected instruction, and seventh instructions for resetting, after the counter has counted down to the dispatch cycle of the rejected instruction, a lookahead state of a different given instruction in the pipeline for each one of a plurality of successive cycles to permit each one of a plurality of given instructions to complete.

* * * * *